United States Patent [19]

Hartung et al.

[11] 4,019,201
[45] Apr. 19, 1977

[54] METHOD AND APPARATUS FOR SCRAMBLING AND UNSCRAMBLING COMMUNICATION SIGNALS

[75] Inventors: Albert F. Hartung, Woodland Hills; Frank W. Lehan, Santa Barbara; Charles T. Barooshian, Pacific Palisades; Edward J. Zacharski, Malibu, all of Calif.

[73] Assignee: System Development Corporation, Santa Monica, Calif.

[22] Filed: Sept. 2, 1975

[21] Appl. No.: 609,573

Related U.S. Application Data

[62] Division of Ser. No. 388,439, Aug. 15, 1973, Pat. No. 3,919,462.

[52] U.S. Cl. .................... 358/124; 358/120
[51] Int. Cl.² ........................ H04N 1/44
[58] Field of Search ............ 178/5.1, DIG. 13

[56] References Cited

UNITED STATES PATENTS

| | | | |
|---|---|---|---|
| 3,081,377 | 3/1963 | Watters | 178/5.1 |
| 3,440,338 | 4/1969 | Walker | 178/5.1 |
| 3,527,877 | 9/1970 | Walker | 178/5.1 |
| 3,777,053 | 12/1973 | Wittig et al. | 178/5.1 |
| 3,789,131 | 1/1974 | Harney | 178/5.1 |
| 3,801,732 | 4/1974 | Reeves | 178/5.1 |
| 3,824,332 | 7/1974 | Horowitz | 178/5.1 |
| 3,885,089 | 5/1975 | Callais et al. | 178/5.1 |

*Primary Examiner*—Maynard R. Wilbur
*Assistant Examiner*—S. C. Buczinski
*Attorney, Agent, or Firm*—Fulwider, Patton, Rieber, Lee & Utecht

[57] ABSTRACT

Method and apparatus for scrambling and unscrambling television video and audio signals in a subscription television system in which program selections of subscribers are known at a central transmitting site, and control signals encoded into vertical blanking intervals of the video signals are addressed to receivers authorized to receive unscrambled transmissions, to selectively control unscrambling at those receivers. In an unscrambler at each subscriber's receiver, the control signals are decoded, and, if addressed to the particular subscriber's receiver, operate to enable or disable the unscrambler, or to frequently vary its mode of operation, thereby greatly increasing the security of the system and deterring viewing of scrambled transmissions. Video scrambling and unscrambling are effected by inversion of selected horizontal lines of a transmitted television picture, and a technique is disclosed for inversion or non-inversion selected on a line-by-line basis, with an appropriate control signal being transmitted with each line.

6 Claims, 16 Drawing Figures

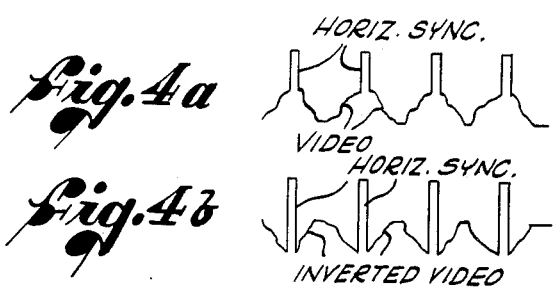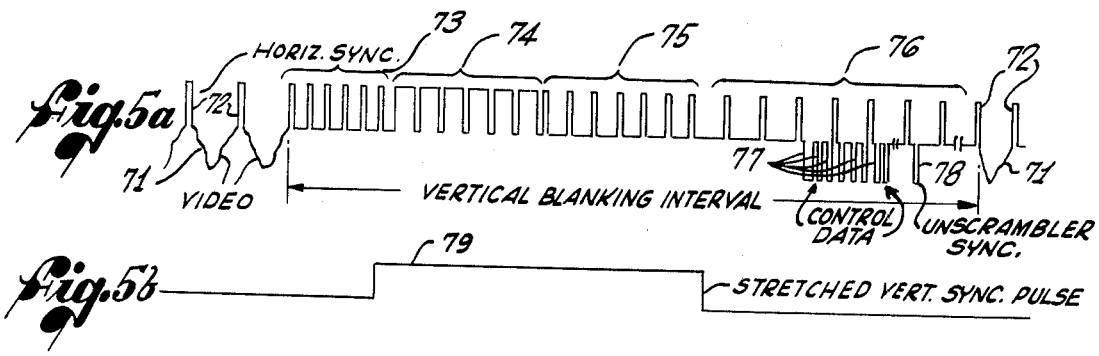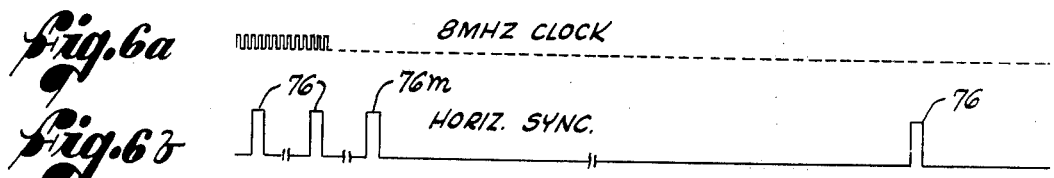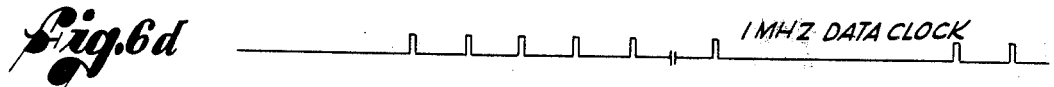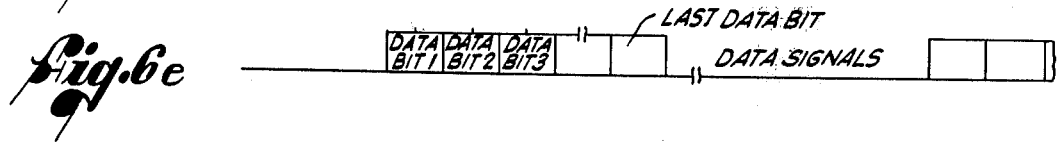

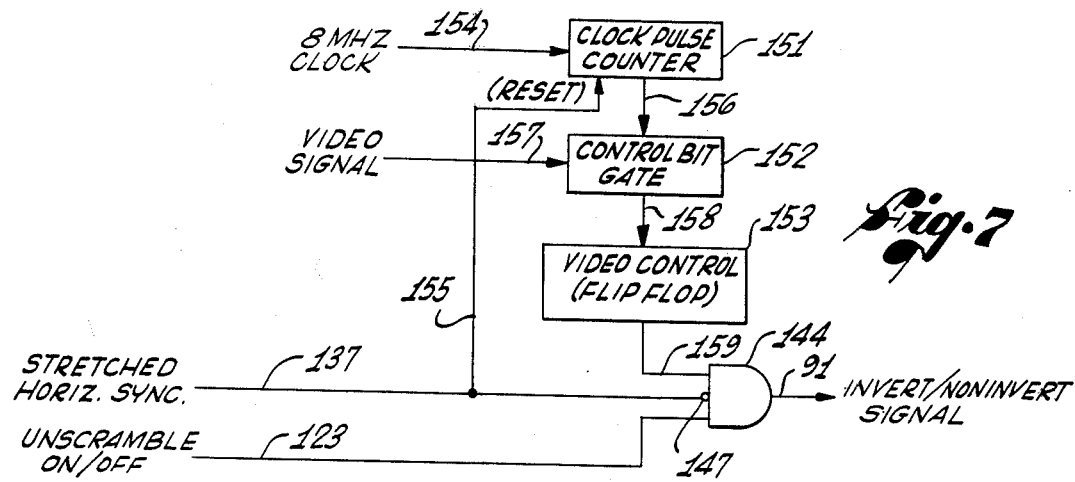

METHOD AND APPARATUS FOR SCRAMBLING AND UNSCRAMBLING COMMUNICATION SIGNALS

This is a division of application Ser. No. 388,439, filed Aug. 15, 1973, now U.S. Pat. No. 3,919,462.

BACKGROUND OF THE INVENTION

This invention relates generally to techniques for scrambling and unscrambling television signals, and, more particularly, to improved scrambling and unscrambling techniques applied to a subscription television system controllable by a central computer.

In subscription television, or "pay-T.V." systems, subscribers select programs that they wish to view, and pay to have those programs transmitted to their television receivers, usually along a coaxial cable. One requirement for such systems is that the transmitted signals should be unintelligible to non-subscribers or to subscribers who have not paid for a particular program. Various methods have been suggested for scrambling video signals, such as by inserting time delays, or by inverting portions of the video signals so that white and black images are reversed on portions of the television screen.

The success of a particular scrambling technique depends, first of all, on whether a program is sufficiently scrambled to deter unauthorized viewers from watching it in a scrambled condition, and secondly, on how difficult it is for a resourceful viewer to circumvent the protection provided by the scrambling techniques.

Some prior systems provide for limited variation of the mode of scrambling and unscrambling, these generally requiring the insertion of a coded card, or the like, to correctly unscramble the signals. However, there has long existed a need for a scrambling technique in which security can be maximized by rapidly and automatically varying the scrambling mode, without the need for manual intervention by the subscribers, and which will effectively deter viewers of the scrambled television picture. The present invention fulfills this need.

SUMMARY OF THE INVENTION

The present invention resides in a method and apparatus for scrambling and unscrambling television video signals, wherein the mode of scrambling and unscrambling may be varied automatically and continually in order to increase the security of the system and to deter unauthorizd viewers.

In a presently preferred embodiment of this invention, video signals are scrambled by the inversion of some of the horizontal lines making up a television picture. This has the disconcerting effect of reversing the black and white portions of the inverted lines, in a black and white picture, or inverting the color spectrum in a color picture. The scrambling mode at any instant may be such that, for example, the inverted lines form patterns of regularly or irregularly spaced bars across the picture, and the bars may be made to roll up or down. Furthermore, the scrambling mode may be changed at a rapid rate, producing an almost infinite variety of moving patterns of inverted lines on the screen if the signals are not unscrambled prior to video display.

The scrambled video signals produced by inversion of some of the horizontal picture lines are unscrambled at each authorized receiver by an unscrambler which is functionally complementary to scrambling means at the transmitter. In the preferred embodiment, some of the control signals needed to effect unscrambling are encoded into a conventionally formed, composite video and synchronization signal, specifically in those portions of the video and synchronization signal relating to vertical blanking intervals, during which a conventional television picture tube has its electron beam returned to the top of the tube after scanning a complete field of the picture.

In the embodiment described and claimed herein, each horizontal line of video information is transmitted with an encoded signal indicating whether the line is inverted or not. The unscrambler decodes this signal and accordingly unscrambles the video signals.

It will be appreciated from the foregoing that the present invention significantly advances the state of the art of scrambling and unscrambling television signals in subscription television video systems. In particular, since the invention is operable to vary the scrambling mode rapidly and automatically, it provides greatly increased security from unauthorized unscrambling of signals intended only for certain subscribers, without the necessity of subscriber identification by manual means. Moreover, the scrambling mode may be selected and varied to deter most unauthorized viewers from watching the scrambled video patterns. Other aspects and advantages of the invention will become apparent from the following more detailed description taken in conjunction with the accompanying drawings.

BRIEF DESCRIPTION OF THE DRAWINGS

FIG. 4a is a time-amplitude graph of a conventional, composite video and synchronization signal;

FIG. 4b is a graph similar to that in FIG. 4a, in which the video signal portions have been inverted;

FIG. 5a is a time-amplitude graph of a composite video and synchronization signal, showing control signals encoded into the vertical blanking interval;

FIG. 5b is a time-amplitude graph of a "stretched" vertical synchronization pulse derived from the signal of FIG. 5a;

FIGS. 6a–e are time-amplitude graphs of various timing and data signals, and together comprise a timing diagram relating to the operation of the unscrambler logic of FIG. 3; and FIG. 7 is a block diagram illustrating a scrambled decoder included in the unscrambler logic of FIG. 3, and embodying the present invention.

DESCRIPTION OF THE PREFERRED EMBODIMENT

Figure 1:
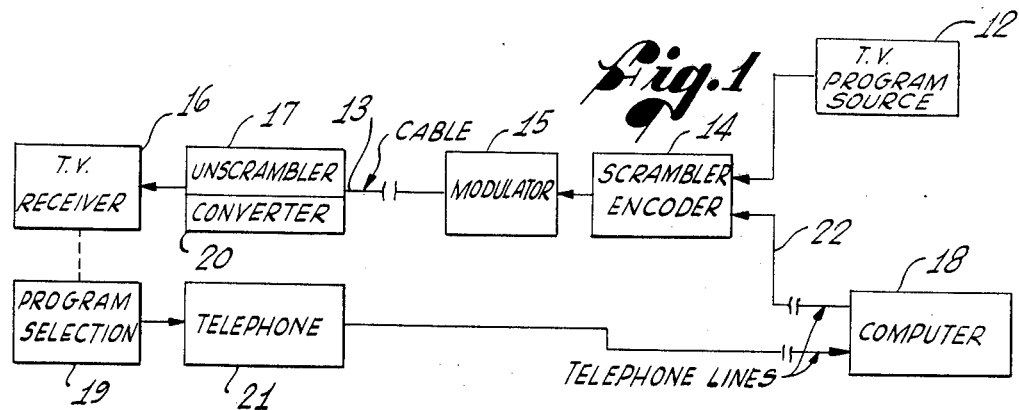
FIG. 1 is a block diagram showing the subsystem components of a subscription television system in which the invention might be used.

As shown in the drawings for purposes of illustration, the invention is particularly well suited for use in a computer controlled subscription television system, the principal components of which are shown in FIG. 1. In such a system, signals from a television program source 12, such as a television camera or a television network, are transmitted to paying subscribers, typically, but not necessarily, by means of a coaxial cable 13. In order to prevent non-subscribers and subscribers who have not paid for a particular program from receiving the transmission, the signals from the television program source 12 are processed by a scrambler-encoder 14, which modifies the signals in some fashion to make them unintelligible to an unauthorized receiver. A modulator 15 uses the signals from the scrambler-encoder 14 to modulate a high frequency carrier for transmission along the cable 13. The modulator 15 is conventional except that its audio portion is realigned to scramble audio signals by shifting the audio carrier and thereby increasing the frequency difference between the video and audio carriers.

Each subscriber to the system has a conventional television receiver 16, and is supplied with an unscrambler 17 connected between the cable 13 and the receiver. The unscrambler 17 may have associated with it a converter 20 for converting specially assigned carrier frequencies, used for transmission over the cable, to a frequency corresponding to an unused numbered channel to which the receiver 16 can be tuned. Although only one receiver 16 is shown in FIG. 1, it will be appreciated that, in general, a number of separate receivers will be connected to the cable 13.

In the system illustrated, a central computer 18 is used to maintain records of available programs and of programs by the subscribers. Each subscriber selects the programs he wishes to view (indicated by the block 19), and conveys his selections to the central computer 18 by means of a telephone 21. The selections may be communicated to the computer 18 directly by means of some digital attachment (not shown) acoustically coupled to the telephone 21, or may be input to the computer by an operator in voice communication with the subscribers. Alternatively, there may be a reverse communication path along the cable 13 to the computer 18, so that a subscriber may select programs by operating switches or buttons (not shown) at his television receiver 16. However the programs are selected is of little consequence so far as the present invention is concerned, so long as there is some means to determine which subscribers are authorized to receive various programs. The scrambler-encoder 14, which is also connected to the computer 18, typically by a telephone line 22, may then be directed to encode appropriate unscrambler control signals for transmission with the conventional television signals.

Figure 2:
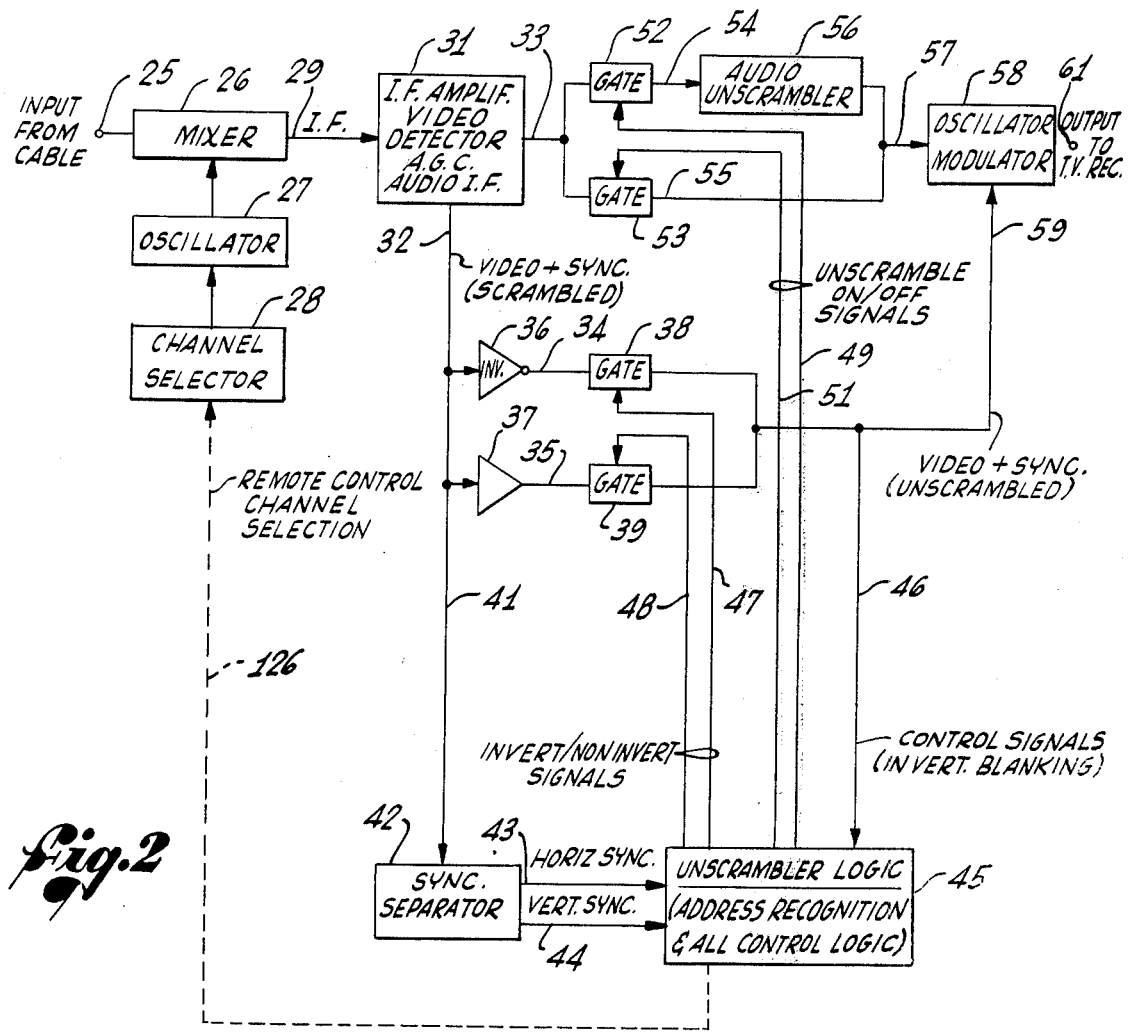
FIG. 2 is a block diagram showing an unscrambler which may be employed in the system of FIG. 1, and showing how the apparatus of the invention might be connected with the system.

The present invention is principally concerned with improved techniques employed in the scrambler-encoder 14 and the unscrambler 17, and FIG. 2 illustrates in block diagram form the unscrambler 17 used in a presently preferred embodiment of the invention. It will be appreciated, however, that, in systems involving signal scrambling and unscrambling, the techniques used in unscrambling are functionally complementary to those used in scrambling. Consequently, although only the unscrambler 17 is described in detail herein, it will be understood that complementary techniques are used in the scrambler-encoder 14, and that these techniques will be readily apparent to those of ordinary skill in the art.

As will be apparent from FIG. 2, many elements of the unscrambler 17 are conventional in the television electronics art, and these are described herein only for the purpose of illustrating the environment in which the improvements constituting the invention will operate. The scrambled television signals from the cable 13 (FIG. 1) are input to the unscrambler 17 through an input terminal 25 and processed by a conventional mixer 26 connected with a conventional oscillator 27 and channel selector 28. The output from the mixer 26 is an intermediate frequency (IF) signal, which, as shown by the line 29, is connected to conventional circuitry performing the functions shown in block 31, including IF amplification, video detection, automatic gain control, and audio IF amplification. As shown in FIG. 2, the output from these conventional circuits grouped in block 31 includes a composite video and synchronization signal, which is still in scrambled form, along line 32, and an audio IF signal, along line 33.

The scrambled video and synchronization signal on line 32 is gated through one of two parallel paths 34 and 35 including an inverting amplifier 36 and a non-inverting amplifier 37, respectively, and controlled by conventional gating circuits 38 and 39, respectively. When the gate 39 is open and the gate 38 is closed, the composite video and synchronization signal is not inverted and appears, for example, like the signal shown in FIG. 4a. However, when the gate 39 is closed and the gate 38 opened for the video portions of the composite signal, the video portions are inverted, as shown in FIG. 4b. The composite video and synchronization signal on line 32 is also input over line 41 to a synchronization separator 42, which uses techniques well known in the art to separate the conventional television synchronization signals from the composite signal, and to transmit these along lines 43 and 44 to unscrambler logic 45, the detail of which is central to this invention, and will be discussed herebelow in connection with FIG. 3.

The unscrambler logic 45 receives control signals encoded in the composite video and synchronization signal along line 46, and operates to generate two basic output control signals: an "invert" or "non-invert" signal on lines 47 and 48, respectively, connected to the gating circuits 38 and 39 to control inversion or non-inversion of the video signal, and an "unscramble on" or "off" signal on lines 49 and 51, respectively, connected to additional gating circuits 52 and 53, respectively, to control audio unscrambling. The audio IF signal on line 33 takes one of two parallel paths 54 and 55 as determined by the gating circuits 52 and 53, the path 54 passing through an audio unscrambler 56 before merging with the alternate path 55 and being input over line 57 to conventional oscillator and modulator circuits 58. The composite video and synchronization signal, as unscrambled under the control of the unscrambler logic 45, is also input to the oscillator and modulator 58, over line 59, and is there used, together with the audio signal input over line 57 to modulate a high frequency carrier signal in a conventional manner. The carrier signal is output from the unscrambler 17 to the receiver 16 through an output terminal 61.

It has been proposed that subscription television systems be assigned so-called "mid-band" frequencies between the frequencies assigned to numbered channels in the very high frequency (VHF) range. If this were the case, and if the receiver 16 (FIG. 1) were not equipped to receive these mid-band channels, the unscrambler illustrated in FIG. 2 would also operate as a frequency converter, i.e., it would be tuned to receive one of the mid-band frequencies, while the oscillator and modulator 58 would be tuned to output a signal at a frequency corresponding to an unused numbered channel, to which the receiver 16 could be tuned to receive the mid-band channels.

The techniques of scrambling and unscrambling television signals as thus far generally described with reference to FIGS. 1 and 2, while not particularly well known, are not believed to be novel, but are believed to require some emphasis in this specification in order to define the environment in which the present invention operates, and to convey an appreciation of its novel aspects and advantages. The present invention is principally concerned with improvements in the techniques of scrambling and unscrambling as specifically embodied in more detailed aspects of the unscrambler logic 45 (FIG. 2).

In the system in which present invention is embodied, the mode by which the scrambling and unscrambling operations are performed may be varied automatically and rapidly in order to increase the security of the system and to deter unauthorized viewing. In brief, the scrambler-encoder 14 (FIG. 1) encodes into the television signal control signals addressed to a particular unscrambler 17 and directing it to initiate or terminate unscrambling operations, to change the mode of unscrambling, or to tune to a different incoming program. The unscrambler 17 (FIG. 1), and more specifically, the unscrambler logic 45 (FIG. 2), operate to decode the control signals and to perform the appropriate control function if it is addressed to the unscrambler 17 in question. If a subscriber has not paid or been charged for a particular program, the unscrambler 17 will not be directed to unscramble the program, which can be viewed, therefore, only in scrambled form. Since the scrambler-encoder 14 can be controlled to select a scrambling mode which results in extremely disconcerting patterns on the receiver 16, most unauthorized viewers are deterred from viewing a scrambler program. Furthermore, the system has a high degree of security, because the mode of scrambling may be rapidly varied in a practically random fashion.

More specifically, the scrambler-encoder 14 encodes control signals in that portion of the normal composite video and synchronization signal known as the vertical blanking interval. As is well known, a television picture is conventionally made up of a number of horizontal lines traced by an electron beam of varying intensity, usually from the top to the bottom of the picture. A full frame of the picture typically consists of two interlaced fields, each tracing alternate lines in the picture. The composite signal producing the trace of a field of the picture comprises, as can be seen in FIG. 5a, a video signal 71 and a succession of horizontal synchronization pulses 72 used to control transition of the beam from one line to the next. Between successive fields of the picture, there is a vertical blanking interval during which the beam is blanked out and positioned for the start of the next field. The vertical blanking interval conventionally includes a group of equalizing pulses 73, some wider vertical synchronization pulses 74, a further group of equalizing pulses 75, followed finally by a number of horizontal synchronization pulses 76 before the first line of video information in a new field.

Using a widely known technique, the control signals to be transmitted to the unscrambler 17 (FIG. 1) are encoded between the horizontal synchronization pulses 76 which occur towards the end of the vertical blanking interval, as shown at 77. The technique is similar, for example, to one used by television networks for encoding time-of-day signals into the vertical blanking interval. In the presently preferred embodiment, there are three "lines" of control signals, each coded in binary digital form as a series of pulses, and each line of signals being addressed to a particular unscrambler 17 (FIG. 1). They may conveniently be thought of as "lines" of signals or data, since they appear between horizontal synchronization pulses in much the same way as lines of video information. However, it will be understood that the control signals occur between fields of the picture and are not normally displayed as video signals. In any one vertical blanking interval, control signals may be transmitted to up to three separate unscramblers 17, using all three "lines", and, since there are 60 vertical blanking intervals per second in television systems in the United States, up to 180 separate unscramblers may be addressed per second. It will be appreciated that a greater number of receivers can be addressed by using more "lines" of the vertical blanking interval or encoding control signals for more than one unscrambler in a single "line". In the unused line immediately following the control signals, an unscrambler synchronization signal 78 is encoded from time to time. This signal, as will be subsequently discussed in detail, is required to synchronize operations of the scrambler-encoder 14 (FIG. 1) and the unscrambler 17.

The unscrambler logic 45 (FIG. 2) receives the composite video and synchronization signal over the line 46, this signal including the control signals encoded as illustrated and discussed with respect to FIG. 5a. In decoding these control signals, the unscrambler logic 45 utilizes horizontal and vertical synchronization pulses separated from the video signal by the synchronization separator 42 and transferred to the unscrambler logic 45 along the lines 43 and 44 respectively. It will be appreciated from FIG. 5a, that there is no single vertical synchronization pulse as such, but rather a series of pulses during the vertical blanking interval. The vertical synchronization pulse transmitted along the line 44 is termed a "stretched" vertical synchronization pulse and is developed in the synchronization separator 42, and illustrated in FIG. 5b. It will be seen that the stretched vertical synchronization pulse begins after the first group of equalizing pulses 73 in the vertical blanking interval, and ends after the final group of equalizing pulses 75 and immediately before resumption of the normally spaced horizontal synchronization pulses 76. As will be seen, the stretched vertical synchronization pulse 79 is utilized in the unscrambler logic 45 in the decoding of the control signals 77 (FIG. 5a) and the unscrambler synchronization signals 78. It should further be noted that the horizontal synchronization signal developed in the synchronization separator 42 (FIG. 2), and transmitted to the unscrambler logic 45 along the line 43, is also a "stretched" horizontal synchronization pulse, including the so-called "front porch" and "back porch" portions of the conventional horizontal synchronization pulse, as well as a color burst signal included in color television transmissions.

The unscrambler logic 45 (FIG. 2) will now be described in greater detail with reference to FIG. 3. Basically, the logic illustrated in FIG. 3 operates to receive control signals encoded in the composite video and synchronization signal, at the terminal 85, to decode those control signals, utilizing the stretched vertical synchronization pulse input at 86 and the stretched horizontal synchronization pulse input at 87, and, if the control signals are addressed to the unscrambler in question, to place the decoded control signals in a control register 88. A scramble decoder 89, which will be discussed in greater detail with reference to FIG. 7, then uses the contents of the control register 88, along with other available signals, to generate the "invert" or "non-invert" signal, as shown at 91. This signal and its inverse, produced by an inverter 90, are the signals transmitted over the lines 47 and 48, respectively, in FIG. 2, and as will be recalled from the description of FIG. 2, these signals are used to control the gating circuits 38 and 39 (FIG. 2) and thereby to unscramble the scrambled video signals.

More specifically, the stretched horizontal synchronization pulses input at 87 are fed to a horizontal synchronization pulse counter 92, which is a conventional, multi-stage, binary counter, arranged to have all of its stages reset to zero by a falling vertical synchronization pulse as introduced over line 93. The horizontal synchronization pulse counter 92 has the states of its various stages connected, as shown by line 94, to a horizontal synchronization count decoder 95, which uses conventional logic to compare the current setting of the horizontal synchronization pulse counter with a range of consecutive numbers designated $m$ through $(m+n-1)$, and to generate an equality signal, as shown on line 96 if the current value of the count falls within that range.

It will be recalled from FIG. 5a that the control signals 77 are encoded between the horizontal synchronization pulses 76 towards the end of the blanking interval. When the stretched vertical synchronization pulse 79 (FIG. 5b) falls, this resets the horizontal synchronization pulse counter 92 (FIG. 3), which then begins to count the immediately following horizontal synchronization pulses 76 (FIG. 5a).

In general, the control signals may be encoded after any of the horizontal synchronization pulses 76 in the vertical blanking interval, but it is here assumed that they are encoded beginning after the $m$th horizontal synchronization pulse following the falling of the stretched vertical synchronization pulse 79 (FIG. 5b) and that the control signals and unscrambler synchronization signal occupy $n$ consecutive "lines" in the vertical blanking interval. The horizontal synchronization count decoder 95 operates to recognize those of the horizontal synchronization pulses 76 (FIG. 5a) which precede each line of control signals 77 or the unscrambler synchronization signal 78.

The equality signal generated by the horizontal synchronization count decoder 95 is connected to a conventional gate circuit, the horizontal synchronization pulse gate 97, into which the stretched horizontal synchronization pulses introduced at 87 are also input over line 98. The gate 97 will, therefore, pass only those horizontal synchronization pulses numbered $m$ through $m+n-1$, i.e., those immediately preceding each line of the control signals 77 and the unscrambler synchronization signal 78 (FIG. 5a). These synchronization pulses are connected along line 99 to the set terminal of a data clock flip-flop 101, the 1 output of which is connected by line 102 to a clock gate 103.

An 8-megahertz clock 104 is also connected to the clock gate 103, as shown by line 105, and the output of the clock gate is connected by line 106 to a data clock circuit 107, the function of which will shortly become clear.

It will be seen that the logic as thus far described operates to set the data clock flip-flop 101 whenever one of the horizontal synchronization pulses preceding a line of control signals encoded in the vertical blanking interval is encountered, and that the data clock flip-flop is in turn used to gate the operation of the 8-megahertz clock 104. FIGS. 6a-e illustrate the timing relationships involved in the logic described thus far. FIG. 6a merely shows the 8-megahertz clock pulses, while FIG. 6b shows a series of horizontal synchronization pulses 76, the $m$th pulse being shown as 76$m$. FIG. 6c illustrates the condition of the data clock flip-flop 101, and it will be noted that the flip-flop is set on the occurrence of the $m$th horizontal synchronization pulse 76$m$, as shown at 108, and is also set on the occurrence of the next subsequent horizontal synchronization pulse, as shown at 109. FIG. 6e represents, on the same time scale, the location of the control signals encoded after the $m$th horizontal synchronization pulse.

In the presently preferred embodiment, the control signals are coded as binary pulses 1 microsecond in width. The function of the 1-megahertz data clock 107 (FIG. 3) is to derive from the 8-megahertz clock 104 (FIG. 3) a sequence of clock pulses spaced by 1 microsecond, as shown in FIG. 6d. It is a further function of the 1-megahertz data clock 107 (FIG. 3) to use a center sampling technique with respect to the encoded control signals, i.e., the 1-megahertz clock pulses shown in FIG. 6d are approximately centered with respect to corresponding binary pulses comprising the encoded control signals. The 1-megahertz data clock 107 (FIG. 3) achieves these functions using conventional digital logic to count the 8-megahertz clock pulses received over the line 106 and to generate an output clock pulse on the line 111 on the occurrence of the fourth incoming clock pulse, and every eighth clock pulse thereafter until the clock gate 103 is turned off.

The clock pulses from the 1-megahertz data clock 107 are transmitted to a data signal gate 112 over line 113, and there used to clock the encoded control signals input at 85 into a conventional serial shift register 114. The clock signals from the 1-megahertz data clock 107 are also directed to a data bit counter 115 over line 116, the counter being connected to generate a signal on line 117 when all bits of one "line" of the control signals have been clocked into the serial shift register 114. At this point, the serial shift register 114 contains the control signals that were encoded in one line of the vertical blanking interval. The signal on the line 117 indicating that all bits of the control signals have been decoded is connected by line 118 to the "clear" terminal of the data clock flip-flop 101. Thus, when all the data in a particular line has been decoded, the data clock flip-flop 101 is cleared to a zero condition, the clock gate 103 is thereby closed, and no further clock pulses are generated by the 1-megahertz data clock 107. When the next horizontal synchronization pulse appears on the line 99, however, the data clock flip-flop 101 is set again, and the whole operation is repeated to clock another line of control signals into the serial shift register 114.

The signal on the line 117 indicating that the serial shift register 114 contains a full set of data, is also utilized to initiate operation of an address comparator 119, as shown by the line 120. The address comparator 119 uses conventional digital techniques to compare the setting of an identifier field, transmitted with the control signals and now in the serial shift register 114, with a unique address assigned to this particular unscrambler. If the comparison is unsuccessful, the control signals in the serial shift register 114 were not addressed to this particular unscrambler, and no further action is taken. In this event, the contents of the serial shift register 114 are lost after the next horizontal synchronization pulse initiating clocking of further control signals into the serial shift register. If, on the other hand, the address comparator 119 successfully matches the identifier field in the serial shift register 114 with the unique identifier of this particular unscrambler, then a control signal is generated on line 121 from the address comparator, and the contents of the serial shift register 114, excluding the identifier field, are gated over line 122 to the control register 88. The address comparator 119 also compares the identifier field in the serial shift register 114 with a special "all-call" identifier used to address all unscramblers in the system, and if a match is found, a control signal is generated on line 121 and the control register 88 receives new data over line 122. By means of this feature, all unscramblers in the system can be enabled or disabled with one control signal transmission.

The contents of the control register 88 include an "unscramble on" or "off" signal which is transferred to the scramble decoder 89 over line 123, to initiate or terminate unscrambling operations, and a mode select field which is also transmitted to the scramble decoder, over line 124, to select the mode according to which unscrambling is to be performed. The control register 88 may also contain a channel select field, as indicated at 125, and this may be connected to the channel selector 28 (FIG. 2) for the purpose of channel selection by remote control from the central computer 18 (FIG. 1), as shown by the dotted line 126 in FIG. 2.

Figure 3:
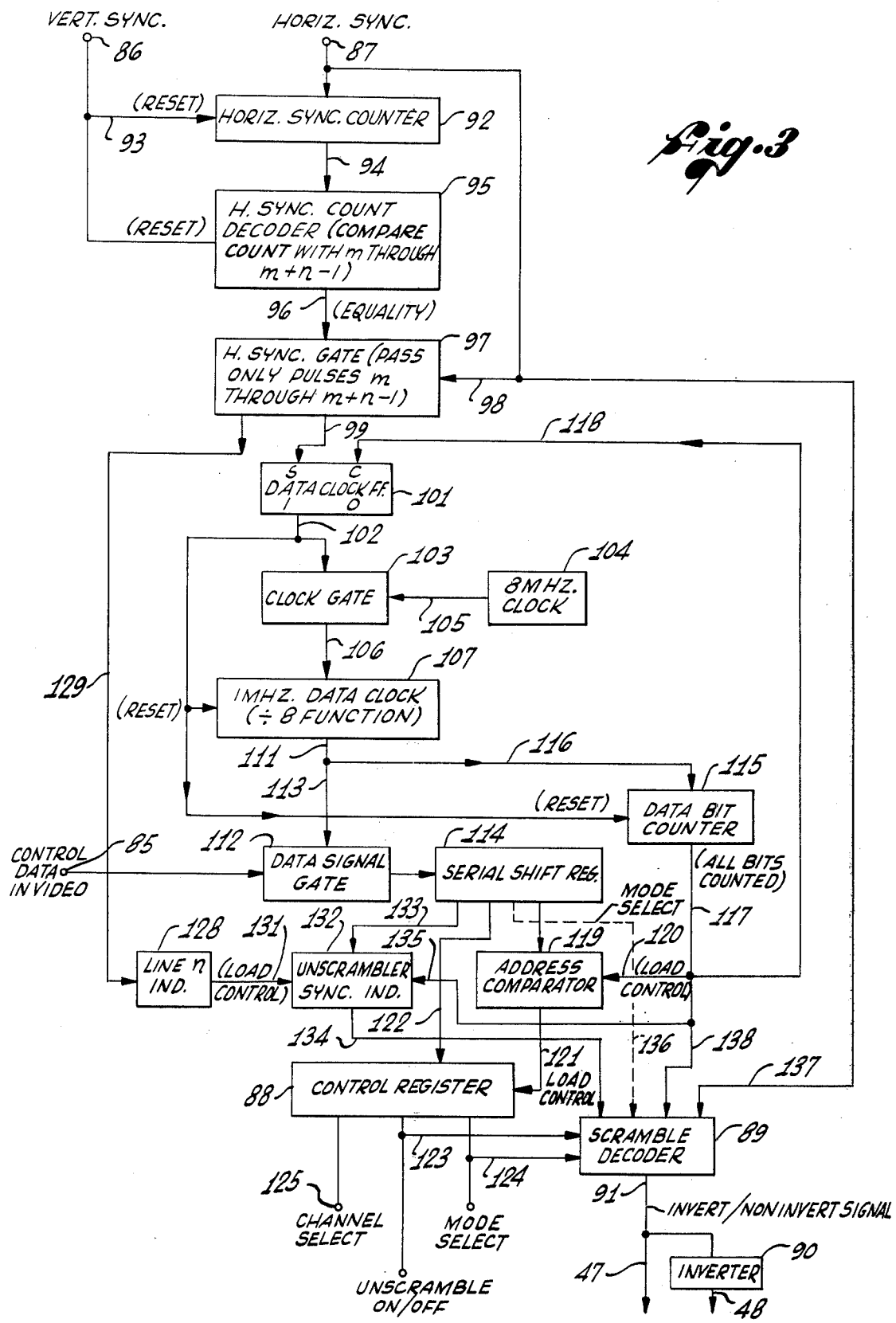
FIG. 3 is a more detailed block diagram of unscrambler logic employed in the unscrambler of FIG. 2.

To complete the description of operation of this portion of the unscrambler logic in FIG. 3, it should also be noted that the 1-megahertz data clock 107 and the data bit counter 115 are reset to a zero condition when the data clock flip-flop 101 is set to a 1 condition by an incoming horizontal synchronization pulse. Thus, each horizontal synchronization pulse initiates a new sequence of clocking and counting incoming control signals.

In general, the contents of the serial shift register 114 (FIG. 3) is volatile, and is of no interest unless the address comparator 119 determines that the control signals are intended for the particular unscrambler. However, there are two important exceptions to this.

The first exception involves decoding of the unscrambler synchronization pulse 78 (FIG. 5a), which is encoded in the last or $n$th line to be decoded in the vertical blanking interval. Only a single bit of information is needed for encoding the pulse, and the identifier field is meaningless in this $n$th line. To decode the unscrambler synchronization pulse, a line $n$ indicator 128 or flip-flop is set only on the occurrence of the nth horizontal synchronization pulse gated by the horizontal synchronization pulse gate 97, as indicated by the line 129. This indicator 128 is used to gate, as shown by line 131, the unscrambler synchronization pulse from the serial shift register 114 into an unscrambler synchronization indicator 132, along the line 133. This unscrambler synchronization indicator 132 is another flip-flop, the output of which is connected to the scramble decoder 89, over line 134, and is used, in related embodiments of this invention, to synchronize unscrambling and scrambling operations. Separate synchronizing signals are not utilized in the invention as claimed in this divisional application, since each line of video information carries its own unscrambling code, as will shortly be discussed in detail.

It should also be noted that gating of the unscrambler synchronization pulse from the serial shift register 114 into the unscrambler synchronization indicator 132 is controlled in part by the control signal from the data bit counter 115 indicating that all data bits of a "line" of control signals have been shifted into the serial shift register 114. This is indicated by the line 135. Thus, the unscrambler synchronization pulse is gated into the unscrambler synchronization indicator 132 only when the line n indicator 128 is set and the unscrambler synchronization pulse has been shifted into its correct position in the serial shift register 114.

The other case where the control register 88 is bypassed and information is taken directly from the serial shift register 114 involves another use of the last or $n$th encoded line of control signals, to contain mode selection information not intended for a particular unscrambler. Instead, this mode selection information is directed to all unscramblers which have previously been enabled by appropriately addressed control signals. Again, this feature is not utilized in the embodiment of the invention claimed in this divisional application, and will not be described in detail.

The scramble decoder 89 also has available as inputs the stretched horizontal synchronization pulses, along line 137, and the signal from the data bit counter 115 indicating that all control signal bits of a line have been entered into the serial shift register 114, as indicated by line 138. How these signals are utilized in the scramble decoder 89 will be discussed below with respect to FIG. 7.

In summary, the logic illustrated in FIG. 3 operates to decode control signals encoded in the vertical blanking interval of the composite of video and synchronization signal, compares the address or identifier contained in the encoded control signals with the unique address of the particular unscrambler, and if a match is found, stores the control signals in the control register 88 for subsequent use by the scramble decoder 89.

The embodiment of the scrambler decoder illustrated in FIG. 7 includes a clock pulse counter 151, a control bit gate 152, a video control flip-flop 153, and an AND gate 144. A video control pulse is encoded into each horizontal synchronization pulse by the scrambler-encoder 14 (FIG. 1), and the logic illustrated in FIG. 7 merely decodes the pulse and utilizes it to determine whether or not to invert the immediately following video signal. The video control pulse is preferably encoded into an unused span of approximately 2 microseconds in the so-called "back porch" portion of the conventional horizontal synchronization pulse, between the color burst signals and the next video information.

The clock pulse counter 151 receives pulses, at an 8-megahertz rate, for example, over line 154, and the counter 151 is reset at the start of each horizontal synchronization pulse as indicated by the line 155. The clock pulse counter 151 measures the time from the start of the horizontal synchronization pulse to the point where the video control pulse is encoded, and then produces a gating signal on line 156, which enables the control bit gate 152 and gates the video control pulse from the video and synchronization signal, input over line 157, into the video control flip-flop 153, over line 158.

The video control flip-flop 153 thus indicates whether the immediately following video signal should be inverted or not, and this signal is connected as one input to the flip-flop 144 along line 159, and an "invert" or "non-invert" signal appears as the output to the AND gate 144. Also input to the AND gate 144 are the stretched horizontal synchronization signal, on line 137, which is inverted before input to the AND gate, and the unscramble on/off signal on line 123. The AND gate 144 ensures that the video signal is inverted only between, but not during, stretched horizontal synchronization pulses, and only when the unscramble on/off signal is in the "on" condition.

It will be appreciated from the foregoing that the present invention significantly advances the state of the art of scrambling and unscrambling television signals, specifically in the field of subscription television systems. In particular, the invention can operate to vary the scrambling mode rapidly and automatically, since unscrambling will always proceed in correspondence with scrambling, and scrambling may be in any desired random or non-random mode. This greatly increases the security of the system from unauthorized unscrambling of signals intended only for certain subscribers, and allows the scrambling mode to be selected and varied so as to deter most unauthorized viewers from watching the scrambled video patterns.

While a particular alternative embodiments of the invention has been illustrated and described in detail, it will be appreciated that various modifications can be made without departing from the spirit and scope of the invention. Accordingly, the invention is not to be limited, except as by the appended claims.

We claim:

1. For use with receivers in a subscription television system, a method of unscrambling composite television video and synchronization signals scrambled by the inversion of video portions corresponding to preselected lines in a television picture, comprising the steps of:
   receiving and decoding inversion indicator signals transmitted one with each line of the television picture; and
   selectively inverting the video signals only when a decoded inversion indicator signal is in a particular state.

2. A method as set forth in claim 1, wherein:
   said inversion indicator signals are encoded each at selected locations with respect to corresponding horizontal synchronization pulses transmitted with the video signals; and
   said step of decoding said inversion indicator signals includes measuring elapsed time from the start of a horizontal synchronization pulse to the location of a corresponding inversion indicator signal, and gating said inversion indicator signal into a register.

3. A method as set forth in claim 1, wherein said step of selectively inverting includes generating an inversion control signal from said inversion indicator signal and from a horizontal synchronization pulse signal, whereby inversion is performed only between horizontal synchronization pulses and only when said inversion indicator signal is in the particular state indicating inversion.

4. For use with receivers in a subscription television system, apparatus for unscrambling composite television video and synchronization signals scrambled by inversion of video portions corresponding to preselected lines in a television picture, said apparatus comprising:
   means for receiving and decoding inversion indicator signals encoded for transmission one with each line of the television picture; and
   means for inverting said video signals only when a decoded inversion indicator signal is in a particular state.

5. Apparatus as set forth in claim 4, wherein:
   said inversion indicator signals are encoded at selected locations with respect to corresponding horizontal synchronization pulses; and
   said means for receiving and decoding said inversion indicator signals includes means for measuring elapsed time from the start of each horizontal synchronization pulse to the location of a corresponding inversion indicator signal, register means, and gating means for gating said inversion indicator signals into said register means.

6. Apparatus as set forth in claim 4, wherein said means for selectively inverting includes means for generating an inversion control signal from said inversion indicator signal and from a horizontal synchronization pulse signal, whereby inversion is performed only between horizontal synchronization pulses and only when said inversion indicator signal is in the particular state indicating inversion.

* * * * *